United States Patent [19]
Miller

[11] 3,788,099
[45] Jan. 29, 1974

[54] FLEXIBLE COUPLING
[75] Inventor: Donald L. Miller, Horseheads, N.Y.
[73] Assignee: The Bendix Corporation, Southfield, Mich.
[22] Filed: June 30, 1971
[21] Appl. No.: 158,352

[52] U.S. Cl. .................................. 64/12, 64/23
[51] Int. Cl. .............................................. F16d 3/06
[58] Field of Search .................. 64/23, 27, 11, 12

[56] References Cited
UNITED STATES PATENTS
2,770,113   11/1956   Nelles .................................... 64/12
3,521,465   7/1970    Bossler ................................... 64/12
3,063,262   11/1962   Greene et al. .......................... 64/27

Primary Examiner—Edward G. Favors
Attorney, Agent, or Firm—Raymond J. Eifler and William S. Thompson

[57] ABSTRACT

A flexible coupling for transmitting torque from an axially movable rotary driving member to a coaxially arranged rotary driven member. The coupling has an inner ring, an outer ring, and a plurality of generally S-shaped interconnecting resilient arms which permit axial flexibility while simultaneously providing reasonably stiff bi-directional torque transmission. The S-shaped arms automatically compensate for any radial lengthening of the coupling that occurs when the driving member moves axially relative to the driven member during torque transmission.

3 Claims, 4 Drawing Figures

PATENTED JAN 29 1974  3,788,099

DONALD L. MILLER
INVENTOR.

BY

FLEXIBLE COUPLING

CROSS REFERENCE TO RELATED CASE

This application is related to commonly assigned copending patent application Ser. No. 158,353 entitled "Flexible Coupling" filed on even date.

FIELD OF THE INVENTION

This invention relates to flexible couplings for transmitting torque from a rotary driving component to a rotary driven component, and more particularly to a return spring for the armature disc of an electromagnetically actuated clutch or brake.

BRIEF DESCRIPTION OF THE PRIOR ART

Electromagnetic clutches and the devices connected by electromagnetic clutches are subject to many destructive forces. Vibrations of various types can be extremely destructive at resonant frequencies. For example, if the shaft connected to the clutch is driven for extended periods under torsional vibration at resonant frequencies, the life will be short and breakage will quickly occur. Furthermore, since electromagnetic clutches engage quickly and suddenly, there is a sharp shock to the clutch and also to devices connected by the clutch. Also, in the event of some failure in the devices connected by the electromagnetic clutch, it is often desirable to disconnect the devices to prevent irreparable damage.

When an electromagnetic clutch of the type mentioned above is used in an art such as the automotive art, the high volume of production places particular emphasis upon simplicity and economy of construction as well as durability of design.

It is generally known in the art of electromagnetic clutches or brakes to receive into a guiding spline provided on the clutch body the armature disc which is axially movable to engage the clutch when energization occurs. However, this process has many drawbacks. For example, a spline connection is rapidly worn and due to clearance required by axial movement, the armature disc is initially only slightly rotatable in a circumferential direction with respect to the spline hub on which it is received. The amplitude of this movement in a circumferential direction increases with the increasing wear of the longitudinal splines, so that upon clutch application, the wear causes more and more strong vibrations in a circumferential direction, said vibrations resulting rapidly in the destruction of the splines.

To overcome this disadvantage, it is known to support the armature by means of a rubber disc secured at its outer periphery to the armature and at its inner periphery to the hub which carries the armature. However, the rubber disc is not suitable for transmitting high torque in a circumferential direction. This drawback has been overcome by disposing within the rubber disc radially extending spring blades which improve its circumferential rigidity.

It is also known in the art to use axially resilient discs in which are formed slots either in the outer or in the inner periphery thereof, or in both peripheries. These discs improved on the axial resiliency necessary for clutch engagement and disengagement, but they were not suitable for carrying a circumferential load.

It is also known in the art to use resilient discs or diaphragms having arcuated slots which are not formed on either the inner or outer periphery thereof. These slots are circumferentially and radially spaced together. Although this type of disc has proved to carry respectable circumferential loads, it has also proven to be too stiff in the axial direction.

SUMMARY OF THE INVENTION

It is, therefore, a primary object of this invention to provide a flexible coupling for an electromagnetic clutch having all the advantages of the aforementioned prior art couplings but not subject to the main limitation thereof, i.e., a coupling which combines high torque transmission capability with soft engaging axial flexibility. Pursuant to this object, a flexible coupling is provided having an inner ring, an outer ring, and a plurality of generally S-shaped connecting arms, the terminal ends of which are connected to the inner and outer rings. Every other connecting arm is inversely disposed so that every pair of connecting arms is symmetrical in form.

It is another object of this invention to provide an improved flexible coupling having greater axial resiliency by substantially increasing the length of the resilient elements without affecting the coupling's circumferential rigidity.

It is still another object of this invention to provide a torque transmitting return spring for an armature of an electromagnetic clutch which reduces vibrations and shock loads due to its soft engaging characteristics.

It is yet another object of this invention to provide a flexible diaphragm of symmetrical design having less tendency to twist or distort under radial loads since stresses are more evenly distributed through substantially uniformly sized torque transmitting members.

It is still a further object of this invention to provide a durable flexible coupling of simple design which easily lends itself to more economical construction than did similar prior art designs.

It is yet another object of this invention to provide a flexible coupling for an electromagnetic clutch wherein the amount of coupling extension or "stretch" necessary to allow armature travel is taken up by new and novel S-shaped torque transmitting members.

DESCRIPTION OF THE PREFERRED EMBODIMENT

Figure 1:
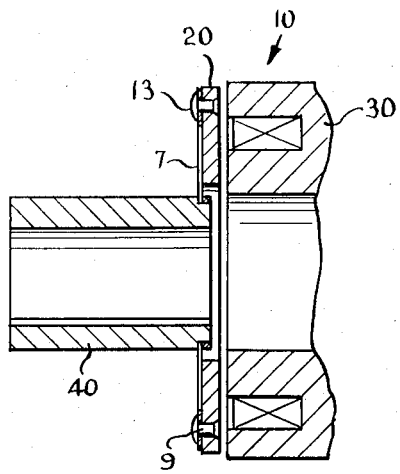
FIG. 1 is a schematic partial cross-sectional view of a typical electromagnetic clutch incorporating my invention.

Referring to FIG. 1, a single-surface electromagnetic clutch is shown, designated generally by the reference numeral 10. Although this type of clutch has been chosen for purpose of illustration, it should be understood by those knowledgeable in the art that my invention can also be utilized with equal effectiveness in multiple disc clutches, cone clutches, and in other applications which dictate similar operating requirements as necessitated by a return spring of an electromagnetic clutch.

Figure 2:
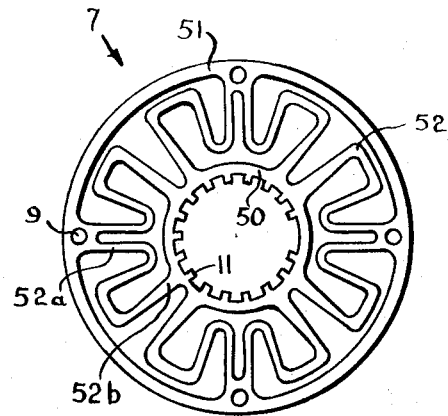
FIG. 2 is a plan view of my invention

Flexible coupling 7 is mounted to hub 40 (a torque transmitting member) by means of teeth 11 (FIG. 2). Coupling 7 may also be aptly termed a torque transmitting diaphragm, or an armature return spring. Diaphragm 7 may be secured to hub 40 by staking the hub teeth (not shown) over the diaphragm or by moving hub material over the edge of the diaphragm teeth 11. Although only one method of mounting diaphragm 7 to hub 40 is shown, other mounting methods could also be used, for example bolting diaphragm 7 to hub 40, welding, etc.

A second torque transmitting member, in this case an armature 20, is arranged coaxially to hub 40, and is secured to diaphragm 7 at its outer periphery by means of a plurality of rivets 13 which are inserted through holes 9 (FIG. 2) in diaphragm 7. Those skilled in the art will appreciate that here again other methods of securing armature 20 to diaphragm 7 could be used with equal effectiveness.

Figure 3:
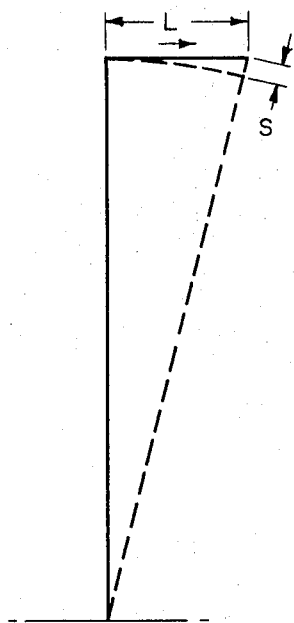
FIG. 3 shows diagrammatically the amount a spring must stretch from its at rest position in order to compensate for armature travel.
Figure 4:
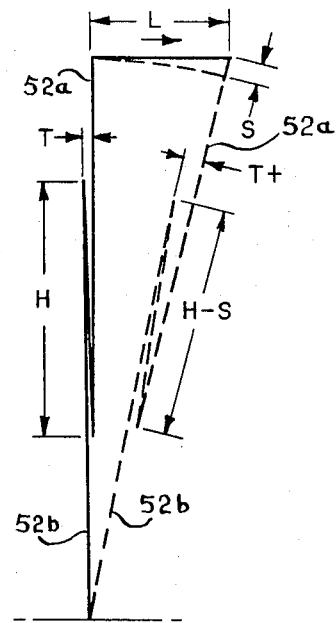
FIG. 4 shows diagrammatically my invention when at rest and its relative position (dotted) when the clutch is engaged.

Magnet body 30 is located coaxial to armature 20 and hub 40, and is spaced a predetermined axial distance away, as shown in FIGS. 3 and 4. As shown, both hub 40 and magnet body 30 are rotatable clutch elements. It should be understood that it is irrelevant as to whether torque is transmitted from hub 40 through armature 20 to magnet body 30, or from magnet body 30 through armature 20 to hub 40. It is only important to recognize that regardless of the direction of torque transmission through the clutch, torque is always transmitted through diaphragm 7. Thus, my invention is entitled "Flexible Coupling" since it may be used whenever torque is to be transmitted from a first torque transmitting member to a second torque transmitting member and at least one of said members is required to move in an axial direction as well as rotationally.

Referring to FIG. 2, torque transmitting diaphragm 7 is shown in plan view. The diaphragm is fabricated from thin resilient steel sheets in a simple punch press operation. Diaphragm 7 is comprised essentially of three principal parts: an inner ring 50 which incorporates a mounting means, for example teeth 11 for fastening to one of the torque transmitting members; an outer ring 51 which incorporates a mounting means, for example holes 9 for fastening to another of the torque transmitting members; and a plurality of generally S-shaped connecting arms 52 each of which has a radially outer arm 52a and a radially inner arm 52b. Every other arm 52 is inversely disposed so that every pair of arms 52 are symmetrical in form. That is, whenever an outer arm 52a connects to the outer ring 51, another outer arm 52a of an adjacent connecting arm 52 will also be connected to outer ring 51 in close proximity thereto. The connecting arms 52 are each substantially uniform in width and as noted above are symmetrically arranged so as to evenly spread the stresses throughout the diaphragm when under torsional load for either direction of rotation. With this diaphragm design, there is less tendency to twist or distort and, therefore, the effective life and performance of the diaphragm is greatly increased.

In order to more efficiently distribute the stresses created under torsional loads, outer arms 52a connect to outer ring 51 in close proximity to holes 9, since this is where diaphragm 7 is fastened to one of the torque transmitting members.

It should be noted that the arc width of connecting arms 52b increases slightly as the arms approach the inner ring 50. This feature is provided in order to supply extra strength in the diaphragm along the inner ring 50 where the stresses are of slightly greater magnitude.

Referring now to FIG. 3, it shows diagrammatically the distance S that a spring must stretch in order to compensate for an axial armature traverse of a distance L. L is the distance the armature travels when going from its at rest position to its position when engaged with magnet body 30.

Referring to FIG. 4, one half of diaphragm 7 is shown diagrammatically as it extends vertically from inner ring 50 (which is taken as the center line). H represents the distance from the radially outer edge of inner arms 52b to the radially inner edge of outer arms 52a. T represents the axial distance between the radially outer edge of inner arms 52b and the outer arms 52a; this distance in the at rest position is at or near to zero. The dotted lines represent the relative positions of the outer and inner arms 52a and 52b respectively, when armature 20 (FIG. 1) to which diaphragm 7 is connected is engaged with magnet body 30, i.e., when the clutch is energized. When the clutch is deenergized, diaphragm 7 disengages armature 20 from magnet body 30 and returns armature 20 to its at rest position (shown in FIG. 1).

With the use of my new and novel diaphragm, the S-shaped connecting arms 52 allow lengthening the amount "S" without developing excessive and/or unwanted stresses in the diaphragm. That is, the distance from the radially outer edge of inner arm 52b to the radially inner edge of outer arm 52a is equal to H-S in the extended or flexed psition. Notice also that the distance T is also increased somewhat in the extended position.

It should be noted by those skilled in the art, that with my invention the two primary requirements of a flexible coupling of this type have been satisfied, i.e., a successful combination in one coupling of high torque transmission capability with a highly flexible axial extension characteristic. By substantially increasing the length of the resilient elements, a coupling is formed with greater axial resiliency (therefore, softer engaging characteristics) without affecting the coupling's circumferential rigidity. Of course, the circumferential rigidity inherent in the diaphragm's design reduces vibrations and shock loads.

Since the coupling or diaphragm is of such simple design, it easily lends itself to more economical construction than any known prior art designs.

While a preferred embodiment of the invention has been disclosed, it will be apparent to those skilled in the art that changes may be made to the invention as set forth in the appended claims, and, in some cases, certain features of the invention may be used to advantage without corresponding use of other features. Accordingly, it is intended that the illustrative and descriptive materials herein be used to illustrate the principles of the invention and not to limit the scope thereof.

I claim:

1. A flexible coupling comprising in combination:
   bi-directional first torque transmitting means;
   bi-directional second torque transmitting means arranged coaxial to said first torque transmitting means and being free to move a predetermined axial distance toward and away from said first torque transmitting means; and bi-directional third torque transmitting means interconnecting said first and said second torque transmitting means, said third torque transmitting means including an inner member and an outer member, said inner and outer members being interconnected by a plurality of curved resilient arms, each of said arms adaptable to radially lengthen the amount necessary to compensate for axial movement of said second torque transmitting means.

2. A flexible coupling comprising in combination:

first torque transmitting means;

second torque transmitting means arranged coaxial to said first torque transmitting means, said second torque transmitting means being free to move axially relative to said first torque transmitting means;

a torque transmitting diaphragm arranged coaxial to said first and said second torque transmitting means, said diaphragm including an inner ring, an outer ring, and a plurality of spaced S-shaped connecting arms, every other arm being inversely disposed, the terminal ends of said arms interconnecting said inner ring to said outer ring;

first fastening means for connecting said diaphragm to said first torque transmitting means; and second fastening means for connecting said diaphragm to said second torque transmitting means.

3. The flexible coupling as claimed in claim 2 wherein said S-shaped connecting arms are each of substantially uniform width.

* * * * *